United States Patent

[11] 3,532,196

[72] Inventor John L. Winge
 South Bend, Indiana
[21] Appl. No. 750,331
[22] Filed Aug. 5, 1968
[45] Patented Oct. 6, 1970
[73] Assignee The Bendix Corporation
 a corporation of Delaware

[54] CALIPER DISC BRAKE WITH MECHANICAL ACTUATOR
 2 Claims, 6 Drawing Figs.
[52] U.S. Cl. ................................. 188/106,
 188/73
[51] Int. Cl. ........................................ F16d 65/14
[50] Field of Search ........................................ 88/73,
 73(CL), 106(F)

[56] References Cited
 UNITED STATES PATENTS
2,946,408 7/1960 Peras ............................ 188/73(C)
3,207,267 9/1965 Beuchle et al. ............. 188/73
 FOREIGN PATENTS
788,841 1/1958 Great Britain ............. 188/73
803,524 10/1958 Great Britain ............. 188/73

Primary Examiner—George E. A. Halvosa
Attorneys—Richard G. Geib and Plante, Arens, Hartz and O'Brien ABSTRACT: A disc brake having a mechanical actuator which includes force multiplication and self-actuation for the parking function of the floating head type of caliper disc brake while retaining non-self-actuating hydraulic actuation for service braking.

INVENTOR.
JOHN L. WINGE
BY Richard L. Geib
ATTORNEY

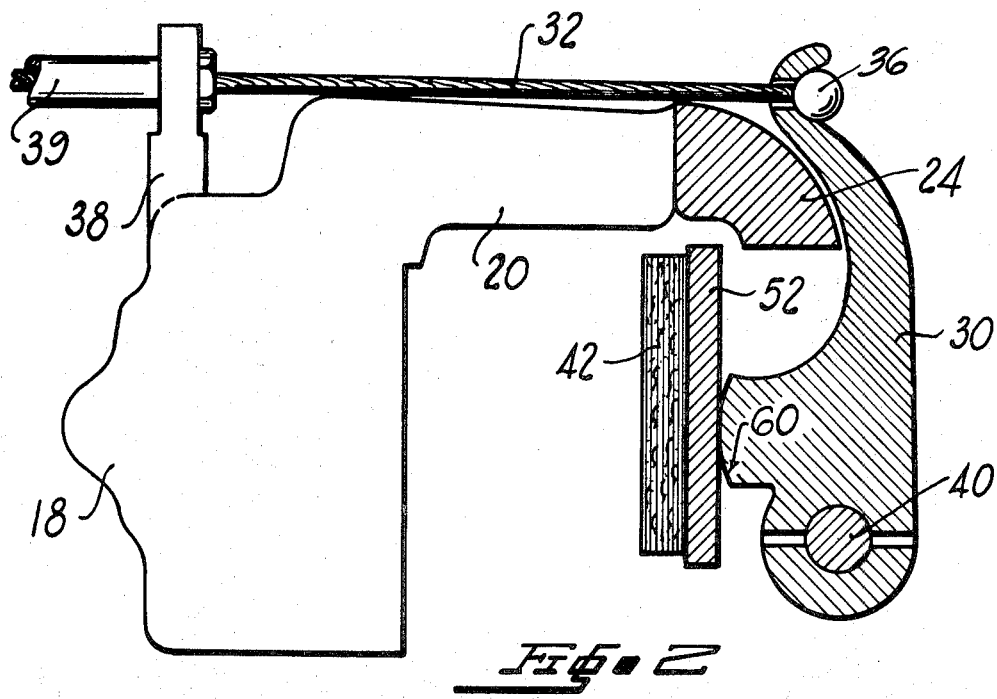
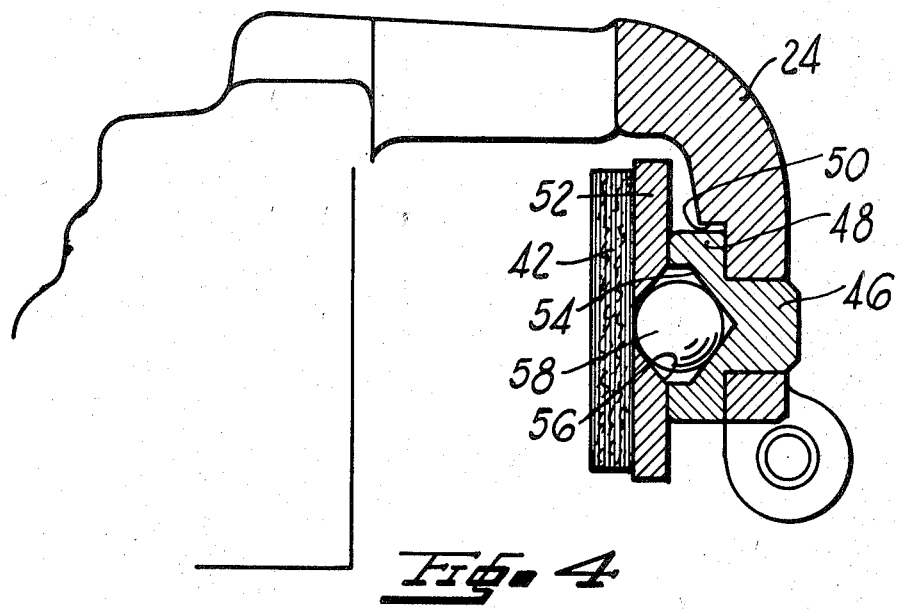

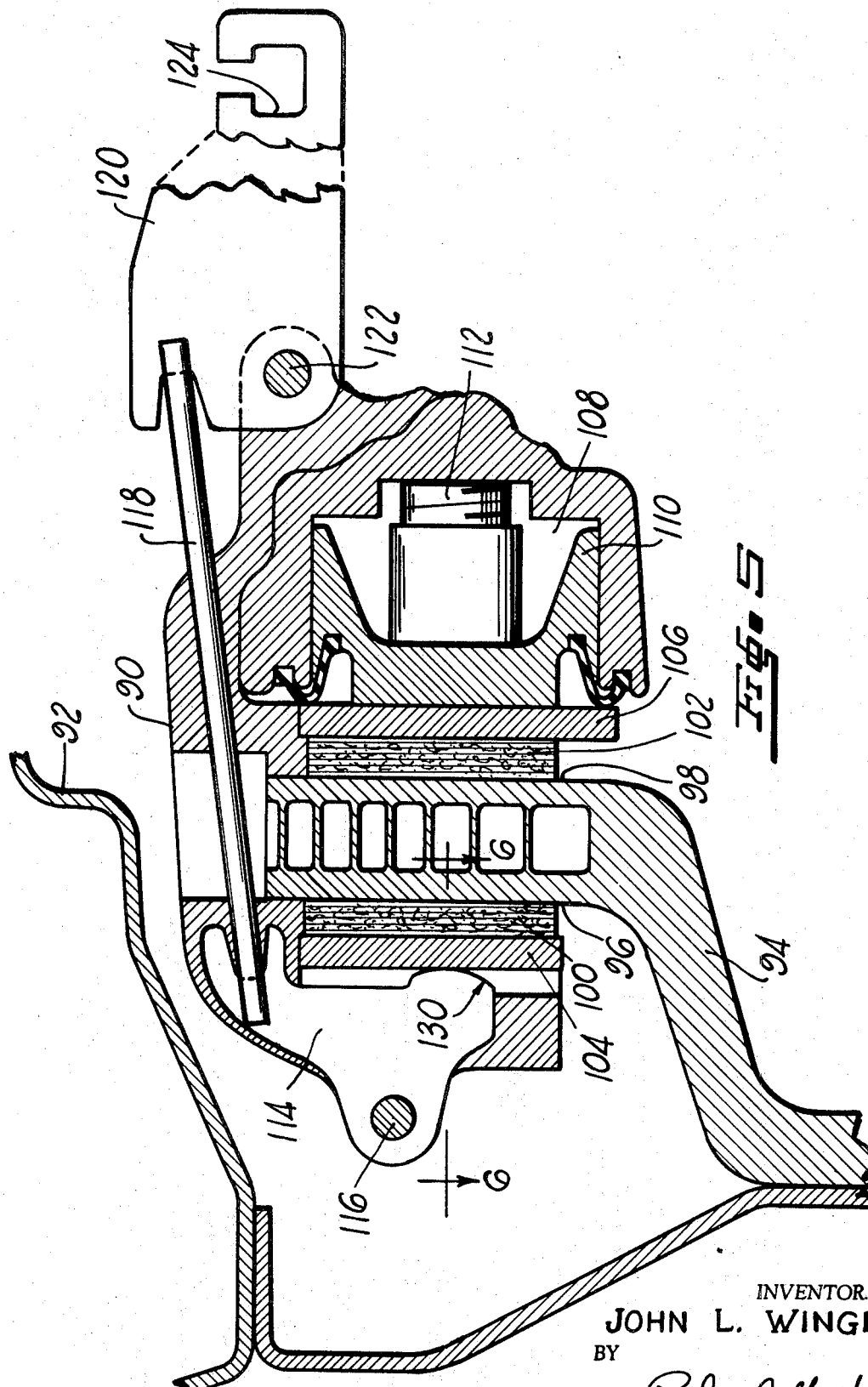

3,532,196

CALIPER DISC BRAKE WITH MECHANICAL ACTUATOR

SUMMARY

Prior art devices have concerned themselves with conjunctive hydraulic and mechanical actuators for disc brakes, for example U.S. Pat. Nos. 2,946,408; 3,185,263 and 3,294,200. Only one of these is illustrative of such a mechanism which applies the mechanical actuator to an opposite disc brake pad than that which the hydraulic actuator is directly concerned, namely U.S. Pat. No. 2,946,408. As with this invention, U.S. Pat. No. 2,946,408 contemplates actuation of the brake mechanically while the hydraulic actuator is functioning.

A principal object of this invention is to employ in combination a lever means and self-energizing arrangement for mechanically applying a disc brake pad.

It should be noted at this juncture that the application of self-energizing features to disc brake pads has been accomplished by the prior art, as exemplified in U.S. Pat. Nos. 3,285,372 and 3,315,769. However, this invention eliminates the problems attendant to these prior art devices. These problems reside mainly in the instability of the brake torque vs. coefficient of friction relationship; i.e., in such brakes the brake torque rises exponentially rather than as a linear response to increase in the coefficient of friction.

Therefore, it is a more detailed object of this invention to provide a self-energizing feature for the disc brake which is operative only with the mechanical operation of the brake as used principally for the parking function and inoperative during hydraulic actuation whereby mechanical advantage is achieved during the former without adverse effect on brake stability in the latter operation.

It is a still further object of this invention to provide a mechanical actuator that for every pound of mechanical force input it will apply a force to the disc brake pads equivalent to approximately twice or more the force required for the same operation while the hydraulic actuator is in operation.

DRAWING DESCRIPTION

Other objects and advantages will appear to those skilled in the art to which this invention relates from the following description of the drawings in which:

FIG. 2 is a partial cross sectional view taken along lines 2-2 of FIG. 3;

FIG. 4 is a partial cross section along lines 4-4 of FIG. 3;

FIG. 5 is still another cross sectional view of a disc brake mechanism in accordance with the principles of this invention.

Figure 1:
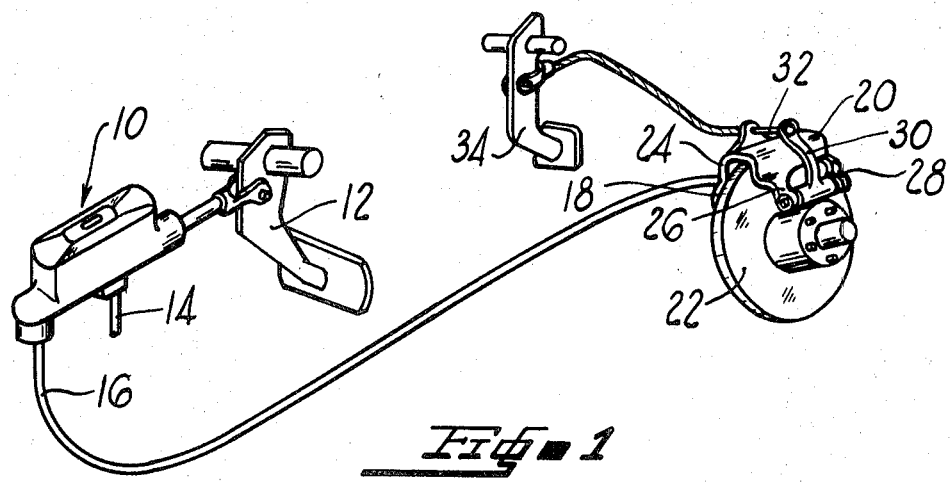
FIG. 1 is an isometric schematic of a brake system employing the disc brake actuator in accordance with the principles of this invention.

With regard, more specifically, to the drawings there is shown in FIG. 1 a master cylinder 10 adapted to be actuated by the brake pedal 12 pivotally arranged within a vehicle to develop separate pressures for conduits 14 and 16. Conduit 14 is communicated to front disc brake motors (not shown); whereas conduit 16, as seen is connected to housing 18 of a rear disc brake mechanism which is supported from the axle housing of the rear wheels of the vehicle. The disc brake housing is essentially formed as a floating caliper head assembly having an upper portion 20 spanning a rotor or disc 22 and terminating in a depending portion 24 having ears 26 and 28 for pivotally mounting a lever 30, which forms the mechanical actuator feature of the disc brake, as will be explained in further detail hereinafter. The lever 30 is connected by a cable 32 to a mechanical brake actuator pedal 34 pivotally mounted similarly to the brake pedal 12.

As seen in FIG. 2, the cable 32 has swaged on its end a ball 36 which fits within a curved portion of the lever 30 to unite the cable therewith. The housing is provided with an ear 38 to which the cable conduit 39 is attached so that upon the actuation of the pedal 34 the lever 30 is pivoted counterclockwise about its pivot pin 40 by pulling the cable towards its fixed conduit support, as at 38, to move the outboard disc brake pad 42 inwardly onto the braking surface of disc 22. The manner of forming the portion 24 with ears 26 and 28 is more readily seen in FIG. 3 with the lever 30 having an annular base portion 44 spanning the distance between the ears 26 and 28. This construction affords a very compact design wherein the lever 30 is within the profile, essentially, of the disc brake mechanism to make it easy to fit within a wheel flange for the vehicle.

Figure 3:
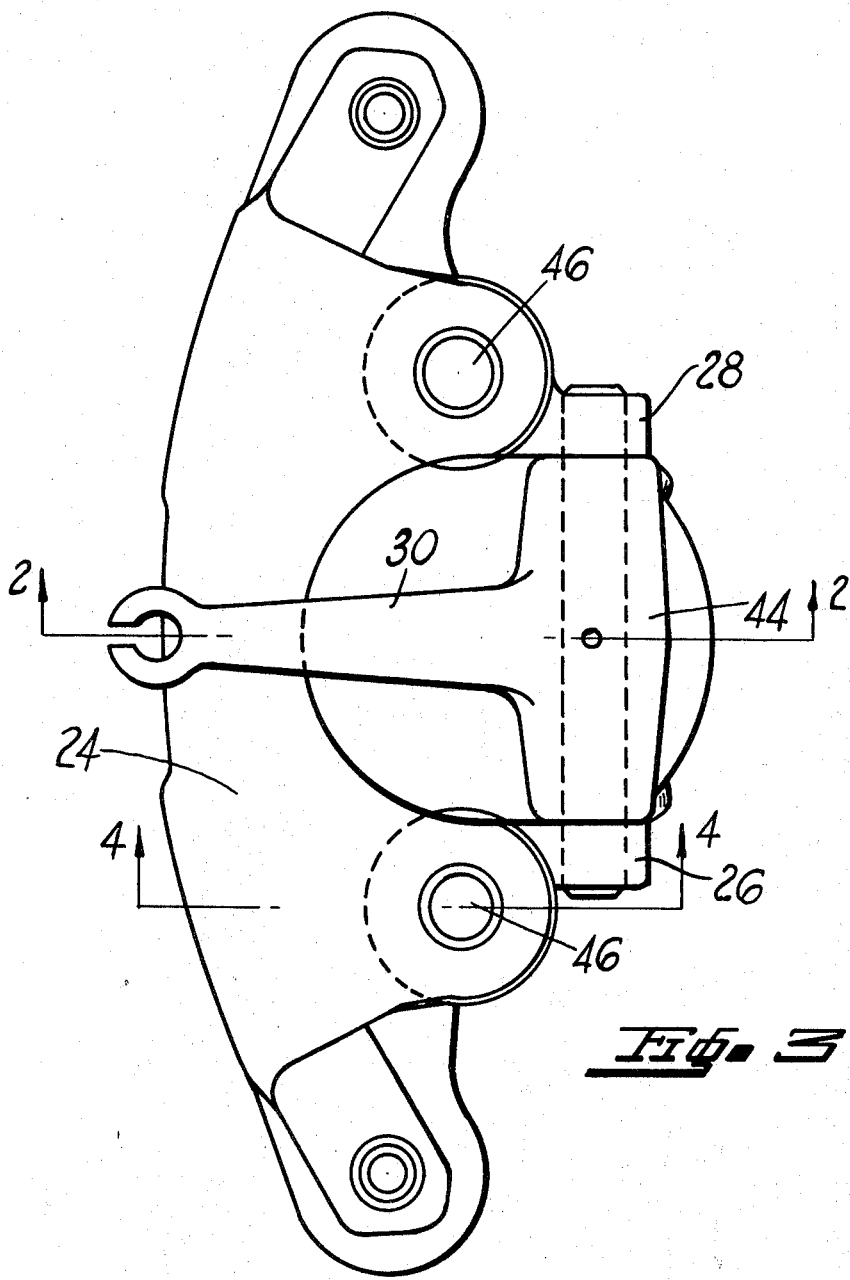
FIG. 3 is a view from the outboard side inwardly of the disc brake actuator of FIGS. 1 and 2.

With respect now to FIG. 4 the mounting of the disc brake pad 42 is shown to be by means of plugs 46 having a flange portion 48 received within a recessed area 50 of the caliper housing portion 24. Brake disc pad 42 is provided with a mounting plate 52 which normally rests against the flange 48 of the plug 46. The plug 46 is provided with a conical cavity 54, and the plate 52 is provided with a conical surface 56. A ball 58 is placed within the conical cavity 54 to be between the surfaces 56 and the plug 46 upon assembly of the pad 42 and plate 52 to the floating caliper housing structure. As seen in FIG. 3, this type of support of the brake disc pad 42 is supplicated at the forward and aft sides of the housing portion 24 to provide similar support for the brake disc pad 42 on each side of the lever actuator 30.

Going back for the moment to FIG. 2, the lever actuator is provided with a rounded surface 60 which abuts on plate 52 so that rocking motion of the lever 30 about the pin 40 will urge the pad 42 onto the braking surface of the disc.

A still further embodiment which this invention may take is shown in FIG. 5 wherein a disc brake floating caliper housing 90 is shown mounted within the general profile of wheel rim 92 to which a disc 94 is connected that extends upwardly to provide braking surfaces 96 and 98 for brake disc pads 100 and 102 that are carried by mounting plates 104 and 106 which are, as will be understood by those skilled in the art, guided by the housing 90 in a preferred form. The housing is shown to include a hydraulic cylinder 108 within which a piston 110 is operable and positioned by an automatic adjuster 112 to maintain the released attitude of the brake pads 100 and 102 on braking surfaces 96 and 98 of disc 94. A lever 114 is pivotally mounted by a pin 116 to the housing 90 and actuatable by a link 118 connected to another lever 120 mounted by pin 122 also to the housing 90. The lever 120 is provided with a cable attachment recess 124 for the attachment thereto of the cable from a parking brake actuator, such as seen in FIG. 1.

Figure 6:
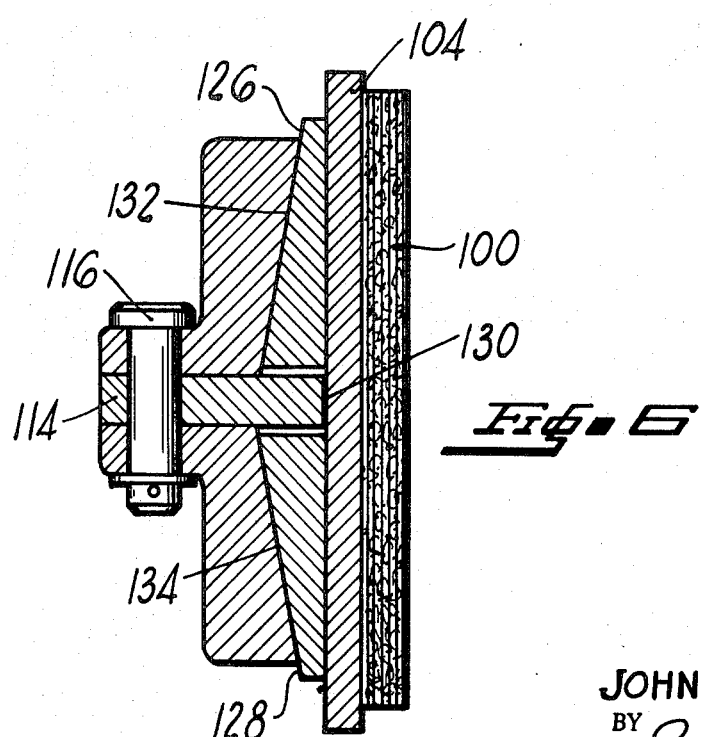
FIG. 6 is a cross sectional view of the outboard pad of FIG. 5 taken along lines 6-6 thereof, illustrating an alternate embodiment of my invention.

With reference now to FIG. 6 the brake disc pad 100 and its mounting plate 104 are shown to be provided with ramp means 126 and 128 on either side of the cam surface 130 of the lever 114 to mate with surfaces 132 and 134 of the housing 90 extending at an angle to the vertical plane of the disc 94.

OPERATION

Having fully described a manner of construction of several embodiments which my invention may make without departing from the novel concepts, it is now desired to set forth the operative sequence for the structure. It is believed that this operative description with respect to the structure of FIG. 5 will be more illustrative perhaps to the reader of the exact concepts involved and that the similarity of this operation with the other structural embodiments are obvious enough that they will not need to be detailed. With this in mind, it should be noted that the hydraulic pressure from the master cylinder 10 of FIG. 1 is communicated via the conduits 16 to the cylinder 108 of the disc of the caliper housing structure 90 to actuate the piston 110 during any hydraulic application of the brake pads 100 and 102. The piston, as will be readily appreciated by those skilled in the art will move the brake pads 102 against braking surface 98 of disc 94 and the reactive forces in the caliper housing 90 will draw the disc pad 100 against braking surfaces 96 also of the disc 94.

As for the mechanical actuation, the brake pedal 34, of FIG. 1, will be actuated to pull a cable fitted by the attachment provision 124 to the lever 120 to put compressive forces in the link 118 whereby lever 114 will be pivoted about pin 116 to move the brake pad 100 onto the braking surface 96 of disc 94. Similarly, with respect to the hydraulic actuation, and as the lever 114 is pivoted to the housing 90, reactive forces from this application of brake pad 100 to braking surface 96 will pass through the housing to the brake pad 102 via the brake adjuster 112 to force it onto the braking surface 98 of the disc 94. It should be noted that, as the actuation forces on lever 120 are on a plane that is at right angles to the horizontal plane of the caliper assembly, the lateral adjustment of the brake pads will not affect the parking brake actuation. Now, with respect to FIG. 6, as the brake pad 100 is being moved outwardly with respect to the housing, the ramps 126 and 128 will be freed from the housing so that the rotation of the disc will cause them to wedge onto one or the other of the angled surfaces 132 or 134 to provide mechanical force multiplication in applying the pad 100 onto the braking surface 96.

It may be well perhaps to go back to the mounting arrangement for the structures of FIGS. 1, 2, 3 and 4 and note, at this time, that a similar situation happens when moving the brake pad 42 inwardly by the pivoting of the lever 30 about the pin 40; *i.e.*, pad 42 and plate 52 move away from the flange 48 whereby the balls 50 may be freed to move onto the surfaces 56 to provide mechanical force multiplication in a similar manner as the ramps 126 and 128 with respect to the surfaces 132 and 134 in FIG. 6.

I claim:
1. In a disc brake:
a rotor having a pair of friction faces;
a torque-taking member;
a caliper slidably mounted on said torque-taking member straddling said rotor;
a pair of friction elements operably connected to said caliper, one of said friction elements being located adjacent each of said friction faces;
mechanical actuation means carried by said caliper engaging only one of said friction elements;
said mechanical actuation means including a lever pivotally mounted on said caliper for urging said one friction element into engagement with said rotor, oppositely facing recesses carried by said caliper and by said one friction element, and force transmitting elements in said recesses, said recesses being formed with inclined sides to provide self-energization of said one shoe only when the brake is actuated;
said force transmitting elements being urged up said inclined sides upon engagement of said one friction element with said rotor to establish a force component urging said one element against said rotor;
a cylinder carried by said caliper having a closed end;
a piston slidable in said cylinder operably connected to the other friction element;
said piston cooperating with the closed end of said cylinder to define a variable volume fluid chamber therebetween adapted to receive pressurized fluid for urging the piston and the other friction element toward said rotor;
abutment means in said chamber operably connected to said piston;
said lever forcing said one element toward said rotor upon pivoting of the lever, and also sliding said caliper on said torque member to urge the cylinder, the piston, the abutment means, and the other friction element toward the rotor, said abutment means engaging said closed end to provide structure rigidly linking said other friction element with said caliper whereupon said other element is forced into engagement with the other friction face and said force transmitting elements are urged up said inclined sides to establish said force component urging the one element toward the rotor, whereby said elements effect increasing resistance to rotor rotation.

2. The disc brake of claim 1, wherein said force transmitting elements are spheres and said recesses are conical, said inclined sides being the conical surfaces of said recesses.